US008277302B2

(12) United States Patent
Walker et al.

(10) Patent No.: US 8,277,302 B2
(45) Date of Patent: Oct. 2, 2012

(54) METHOD AND APPARATUS FOR PROVIDING A BONUS TO A PLAYER

(75) Inventors: Jay S. Walker, Ridgefield, CT (US); Russell P. Sammon, San Francisco, CA (US); James A. Jorasch, Westport, CT (US); Scott T. Friesen, New York, NY (US)

(73) Assignee: IGT, Reno, NV (US)

( * ) Notice: Subject to any disclaimer, the term of this patent is extended or adjusted under 35 U.S.C. 154(b) by 1399 days.

(21) Appl. No.: 11/743,353

(22) Filed: May 2, 2007
(Under 37 CFR 1.47)

(65) Prior Publication Data

US 2008/0272541 A1 Nov. 6, 2008

(51) Int. Cl.
*A63F 13/00* (2006.01)

(52) U.S. Cl. ............................ 463/18; 273/139; 463/17

(58) Field of Classification Search .................... 463/18, 463/17; 273/139

See application file for complete search history.

(56) References Cited

U.S. PATENT DOCUMENTS

| | | | | | |
|---|---|---|---|---|---|
| 4,494,197 | A | * | 1/1985 | Troy et al. | 463/18 |
| 4,648,600 | A | | 3/1987 | Olliges | 273/138 |
| 4,764,666 | A | * | 8/1988 | Bergeron | 463/25 |
| 5,123,649 | A | | 6/1992 | Tiberio | |
| 5,205,555 | A | | 4/1993 | Hamano | |
| 5,354,069 | A | * | 10/1994 | Guttman et al. | 463/25 |
| 5,577,971 | A | | 11/1996 | File | 473/54 |
| 5,645,486 | A | | 7/1997 | Nagao et al. | |
| 5,655,961 | A | | 8/1997 | Acres et al. | |
| 5,741,183 | A | | 4/1998 | Acres et al. | |
| 5,752,882 | A | | 5/1998 | Acres et al. | |
| 5,766,076 | A | | 6/1998 | Pease et al. | |
| 5,770,533 | A | * | 6/1998 | Franchi | 463/42 |
| 5,807,172 | A | | 9/1998 | Piechowiak | |
| 5,836,817 | A | | 11/1998 | Acres et al. | |
| 5,876,284 | A | | 3/1999 | Acres et al. | |
| 5,885,158 | A | | 3/1999 | Torango et al. | |
| 5,941,773 | A | | 8/1999 | Harlick | |
| 6,001,016 | A | | 12/1999 | Walker et al. | |
| 6,089,977 | A | | 7/2000 | Bennett | |
| 6,162,122 | A | | 12/2000 | Acres et al. | |
| 6,174,234 | B1 | | 1/2001 | Seibert, Jr. et al. | 463/20 |
| 6,227,969 | B1 | | 5/2001 | Yoseloff | 463/13 |
| 6,231,445 | B1 | | 5/2001 | Acres | |
| 6,241,608 | B1 | | 6/2001 | Torango | |
| 6,244,958 | B1 | | 6/2001 | Acres | |

(Continued)

OTHER PUBLICATIONS

Brennan, Shel. "How Pinball Machines Work". Howstuffworks entertainment.howstuffworks.com/pinball-machine.htm/printable. Download date Jan. 24, 2007. 5 pgs.

*Primary Examiner* — David L Lewis
*Assistant Examiner* — William H McCulloch, Jr.
(74) *Attorney, Agent, or Firm* — Neal, Gerber & Eisenberg LLP

(57) ABSTRACT

A method, system, device and computer readable medium are described, in which a wagering game and a secondary game may be provided at a gaming device, wherein the secondary game comprises detecting an occurrence of a trigger; determining, responsive to the trigger, a player number based on a first criterion; determining, responsive to the trigger, a match number based on a second criterion; and determining if the match number meets a third criterion with respect to the player number.

44 Claims, 9 Drawing Sheets

U.S. PATENT DOCUMENTS

| | | | | |
|---|---|---|---|---|
| 6,254,483 | B1 | 7/2001 | Acres | |
| 6,257,981 | B1 | 7/2001 | Acres et al. | |
| 6,346,043 | B1 | 2/2002 | Colin et al. | |
| 6,461,241 | B1 | 10/2002 | Webb et al. | |
| 6,464,582 | B1 | 10/2002 | Baerlocher et al. | |
| 6,497,408 | B1 * | 12/2002 | Walker et al. | 273/138.1 |
| 6,565,434 | B1 * | 5/2003 | Acres | 463/25 |
| 6,592,460 | B2 | 7/2003 | Torango | |
| 6,733,389 | B2 | 5/2004 | Webb et al. | |
| 6,749,502 | B2 | 6/2004 | Baerlocher | |
| 6,840,858 | B2 | 1/2005 | Adams | |
| 6,851,674 | B2 | 2/2005 | Pierce et al. | 273/139 |
| 6,855,053 | B2 | 2/2005 | Baerlocher | |
| 6,964,416 | B2 | 11/2005 | McClintic et al. | |
| 7,040,983 | B2 | 5/2006 | Dolloff et al. | |
| 7,056,215 | B1 | 6/2006 | Olive | |
| 7,094,149 | B2 * | 8/2006 | Walker et al. | 463/25 |
| 7,128,646 | B2 | 10/2006 | Baerlocher et al. | |
| 7,172,506 | B2 | 2/2007 | Baerlocher et al. | |
| 7,179,167 | B2 * | 2/2007 | deKeller | 463/18 |
| 7,229,350 | B2 | 6/2007 | Baerlocher et al. | |
| 7,267,614 | B1 * | 9/2007 | Jorasch et al. | 463/25 |
| 7,399,226 | B2 | 7/2008 | Mishra | |
| 7,399,227 | B2 * | 7/2008 | Michaelson et al. | 463/18 |
| 7,470,186 | B2 | 12/2008 | Cannon | |
| 7,549,920 | B2 * | 6/2009 | Jorasch et al. | 463/16 |
| 7,553,234 | B2 * | 6/2009 | Walker et al. | 463/43 |
| 7,553,235 | B2 * | 6/2009 | Walker et al. | 463/43 |
| 7,682,241 | B2 * | 3/2010 | Baerlocher | 463/18 |
| 7,749,080 | B2 * | 7/2010 | Szrek et al. | 463/29 |
| 7,794,322 | B2 * | 9/2010 | Schneider et al. | 463/27 |
| 7,798,895 | B2 * | 9/2010 | Jubinville et al. | 463/18 |
| 7,821,404 | B2 * | 10/2010 | Walker et al. | 340/573.1 |
| 7,850,518 | B2 * | 12/2010 | Walker et al. | 463/17 |
| 7,878,896 | B2 * | 2/2011 | Jorasch et al. | 463/20 |
| 8,029,357 | B2 * | 10/2011 | Jorasch et al. | 463/25 |
| 8,092,224 | B2 * | 1/2012 | Walker et al. | 434/236 |
| 8,167,705 | B2 * | 5/2012 | Jorasch et al. | 463/25 |
| 2002/0128057 | A1 * | 9/2002 | Walker et al. | 463/20 |
| 2003/0017867 | A1 * | 1/2003 | deKeller | 463/18 |
| 2003/0047869 | A1 * | 3/2003 | Walker et al. | 273/139 |
| 2003/0064788 | A1 * | 4/2003 | Walker et al. | 463/20 |
| 2004/0053668 | A1 * | 3/2004 | Baerlocher | 463/18 |
| 2004/0082384 | A1 * | 4/2004 | Walker et al. | 463/40 |
| 2004/0192429 | A1 * | 9/2004 | Moody | 463/16 |
| 2004/0236944 | A1 * | 11/2004 | Walker et al. | 713/161 |
| 2004/0242332 | A1 * | 12/2004 | Walker et al. | 463/42 |
| 2004/0259629 | A1 * | 12/2004 | Michaelson et al. | 463/22 |
| 2005/0043096 | A1 * | 2/2005 | Kerr | 463/42 |
| 2005/0070353 | A1 | 3/2005 | Webb et al. | |
| 2005/0215316 | A1 * | 9/2005 | Rowe et al. | 463/29 |
| 2006/0094498 | A1 * | 5/2006 | Jorasch et al. | 463/25 |
| 2006/0121984 | A1 * | 6/2006 | Jorasch et al. | 463/29 |
| 2006/0128462 | A1 * | 6/2006 | Jorasch et al. | 463/25 |
| 2006/0135242 | A1 | 6/2006 | Tarantino | |
| 2006/0148559 | A1 * | 7/2006 | Jordan et al. | 463/29 |
| 2006/0148562 | A1 * | 7/2006 | Walker et al. | 463/30 |
| 2006/0217186 | A1 * | 9/2006 | Jorasch et al. | 463/25 |
| 2006/0234792 | A1 * | 10/2006 | Walker et al. | 463/20 |
| 2006/0234793 | A1 * | 10/2006 | Walker et al. | 463/20 |
| 2007/0184887 | A1 | 8/2007 | Cannon | |
| 2007/0218982 | A1 * | 9/2007 | Baerlocher | 463/27 |
| 2007/0293309 | A1 * | 12/2007 | Jorasch et al. | 463/25 |
| 2008/0090634 | A1 | 4/2008 | Baerlocher | |
| 2008/0090650 | A1 | 4/2008 | Tarantino | |
| 2010/0285869 | A1 * | 11/2010 | Walker et al. | 463/25 |

* cited by examiner

511

| | TRIGGER IDENTIFIER E20 | TRIGGER DESCRIPTION E21 | COMPARISON TO PERFORM E30 |
|---|---|---|---|
| a | TRIG-123487-01 | (TOTAL_SPINS % 10) = 0 | COMP-012938-01 |
| b | TRIG-123487-02 | BUTTON_PRESSED (CASH_OUT_BUTTON) AND (TOTAL_SPINS >= 100) | COMP-012938-02 |
| c | TRIG-123487-03 | EVENT (CASH_INSERTED) AND (VALUE_OF_CASH_INSERTED >= $20.00) | COMP-012938-03 |
| d | TRIG-123487-04 | (RATE_OF_PLAY > 10 COINS PER MINUTE) AND ((DURATION_OF_SESSION_IN_MINUTES % 5) = 0) | COMP-012938-04 |
| e | TRIG-123487-05 | OUTCOME_DISPLAYED (BAR-BAR-CHERRY) | COMP-012938-05 |
| f | TRIG-123487-06 | TIME_OF_DAY = (1200) OR (1400) OR (1600) OR (1800) | COMP-012938-06 |
| g | TRIG-123487-07 | (WINNING_OUTCOME) AND (PRIZE_VALUE > $10) | COMP-012938-05 |
| h | TRIG-123487-08 | (RATE_OF_PLAY (BANK_OF_GAME_MACHINES) > 100 COINS PER MINUTE) AND (DURATION_OF_SESSION_IN_SECONDS % 60) | COMP-012938-08 |
| i | TRIG-123487-09 | (PLAYER_TRACKING_CARD_INSERTED) AND EVENT (OUTCOME_DISPLAYED) | COMP-012938-06 |

FIG. 5

612

| | COMPARISON IDENTIFIER 630 | PLAYER NUMBER DEFINITION 661 | PLAYER NUMBER DESCRIPTION 631 | MATCH NUMBER DEFINITION 662 | MATCH NUMBER DESCRIPTION 632 | METHOD OF COMPARISON 633 | BONUS DESCRIPTION 641 |
|---|---|---|---|---|---|---|---|
| a → | COMP-012938-01 | PLAYER = CREDIT_BALANCE | CREDIT BALANCE | MATCH = RANDOM (MIN=0, MAX=99) | RANDOM NUMBER FROM 0 TO 99 | (PLAYER % 100) = MATCH | 3 COINS |
| b → | COMP-012938-02 | PLAYER = GAMES_PLAYED | GAMES PLAYED IN THIS SESSION | MATCH = RANDOM (MIN=0, MAX=9) | RANDOM NUMBER FROM 0 TO 9 | TENS_DIGIT (PLAYER) = MATCH | COUPON FOR MOVIE TICKET |
| c → | COMP-012938-03 | PLAYER = PROGRESSIVE JACKPOT VALUE | PROGRESSIVE JACKPOT VALUE | MATCH = RANDOM (MIN=0, MAX=999) | RANDOM NUMBER FROM 0 TO 999 | (PLAYER % 1000) = MATCH | AUTOMATIC ENTRY INTO BONUS ROUND |
| d → | COMP-012938-04 | PLAYER = BIRTHDAY (1, 366) | PLAYER'S BIRTHDAY | MATCH = RANDOM (DAYS_OF_YEAR) | RANDOM DAY OF THE YEAR | PLAYER = MATCH | JACKPOT DOUBLED FOR NEXT 10 MIN |
| e → | COMP-012938-05 | PLAYER = COMP_POINTS | NUMBER OF COMP POINTS | MATCH = SSN | PLAYER'S SOCIAL SECURITY NUMBER | PLAYER % 1000 > MATCH % 1000 | 1,000 COMP POINTS |
| f → | COMP-012938-06 | PLAYER = ZIPCODE | PLAYER'S ZIPCODE | MATCH = RANDOM (ALL_ZIPCODES) | RANDOM ZIPCODE | PLAYER = MATCH | $10.00 |
| g → | COMP-012938-07 | PLAYER = BIRTHDAY (1, 365) | PLAYER'S BIRTHDAY | MATCH = WEIGHTED_RANDOM (DAYS_OF_YEAR, CURRENT_MONTH_WEIGHTED) | RANDOM DAY, WEIGHTED RANDOM MONTH | PLAYER = MATCH | SOUVENEIR T-SHIRT |
| h → | COMP-012938-08 | PLAYER = CREDIT_BALANCE | CREDIT BALANCE | MATCH = LUCKY_NUMBER | PLAYER'S LUCKY NUMBER | PLAYER % 1000 = MATCH | FREE JACKPOT-ONLY SPIN |

FIG. 6

METHOD AND APPARATUS FOR PROVIDING A BONUS TO A PLAYER

FIELD OF THE INVENTION

The present disclosure relates to a game of chance and more particularly to increasing the suspense attainable during revelation of a result within a game of chance.

BRIEF DESCRIPTION OF THE DRAWINGS

FIG. 5 illustrates a table representing a portion of a trigger database according to one or more example embodiments.

FIG. 6 illustrates a table representing a portion of a comparison database according to one or more example embodiments.

DETAILED DESCRIPTION

Figure 1:
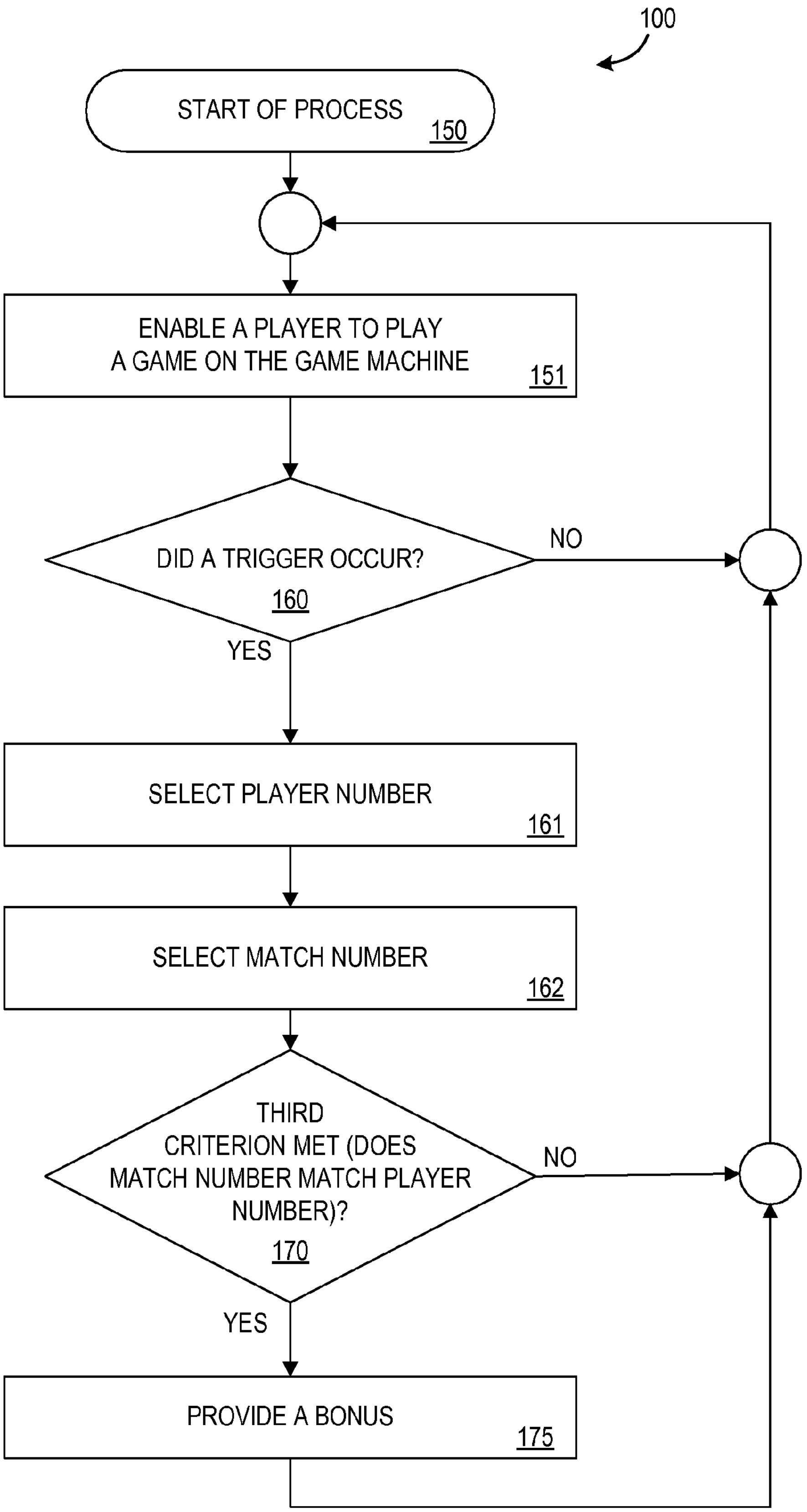
FIG. 1 illustrates a flow chart of an example embodiment of the methodology of the present invention.

Gaming devices such as slot machines, video poker machines and other devices operable to facilitate wagering games, are a major draw for players visiting a casino. Many casinos generate a majority of their revenues from such gaming devices. Players are often drawn to gaming devices for the possibility of winning large amounts of money within a relatively short period of time, and by the general excitement of such machines.

In order to attract players to gaming devices, gaming device manufacturers have added various bonus features to the gaming devices that they produce. For example, some slot machines have "bonus rounds" in which the traditional reel-spinning operation of a slot machine is suspended and a player may instead participate in playing a bonus game to win prizes. However, game play during these bonus rounds may be very different from the traditional operation of a slot machine. There is a need for a method of providing bonuses to players of gaming devices in an exciting but understandable manner.

Applicants have recognized that many players of gaming devices such as slot machines and video poker machines are familiar with the operation of pinball machines. For example, players of gaming devices are often in the same demographic category as people who may have played pinball machines when they were growing up. Many of these players already understand how the bonus "matching" features on pinball machines work. One object of embodiments described herein is to take advantage of players' prior knowledge of bonus matching features on pinball machines by creating similar bonus matching features in the new context of gaming devices operable to facilitate wagering games, such as slot machines and video poker machines.

Pinball machines are a popular form of entertainment. To add excitement to the game, some pinball machines offer a bonus "matching" game in which a random "match" number is generated and matched to another number associated with the pinball machine, such as a player's pinball score. This enables players to overcome negative emotions associated with a loss by offering "free balls" and/or "free games." As discussed in www.howstuffworks.com/pinball-machine4.htm, a pinball machine's CPU randomly generates a number and if the number and/or parts of the number "matches" the numbers in the player's score, the player may be given either a free ball or an entirely new game.

Applicants have recognized that gaming devices may benefit from the addition of a matching feature in a number of ways. According to one embodiment, a wagering game and a secondary game are provided at a gaming device, wherein the secondary game comprises detecting an occurrence of a trigger; determining, responsive to the trigger, a player number based on a first criterion; determining, responsive to the trigger, a match number based on a second criterion; and determining if the match number meets a third criterion with respect to the player number. If the third criterion is met, a benefit may be provided.

A trigger event may be any event associated with a player or game play, such as a win in the wagering game or a cash out request by the player. The first criterion may be a characteristic of or associated with the player, device or group of devices, such as a credit meter balance, birthday, social security number, or progressive jackpot value. The first criterion may also be a randomly generated number. The player number may be a number based on or associated with the first criterion. For example, if the first criterion is a player's credit meter balance, e.g., $25.00, the player number based on the credit meter balance may be 25. In many embodiments, the first criterion and player number are the same; for example, a social security number can be both a first criterion and a player number. The player number may also be any displayed number, i.e., a number that is displayed at or in association with the gaming device.

The second criterion may be similar to the first criterion in that it may also be a characteristic of or associated with the player, device or group of devices, or may be a randomly generated number. The match number may be based on or associated with the second criterion. The third criterion may be an exact match, i.e., the player number and match number are equal. The criterion may be that the player number is greater than, less than, or within a specified range of the match number, or may define any other relationship between the player number and match number. Applicants point out that these examples are in now way limiting, and that the scope of Applicants' claims are defined by the claims themselves.

According to one embodiment, a secondary game may be provided to a player of a wagering game wherein the secondary game provides a bonus to the player if a match number generated by a gaming device "matches" a number associated with the gaming device (e.g., a credit balance, a progressive jackpot value). For example, after a player achieves an outcome on a gaming device (a "trigger" event such as a player win of a predefined magnitude), the gaming device may determine a random number in response to the trigger. The gaming device may then compare the random number to the player's credit balance (or other number associated with the player, device or game) on the gaming device. If the two numbers "match" (e.g., the two numbers are equal), then a bonus may be provided to the player.

Another embodiment comprises providing a wagering game and a secondary game at a gaming device, the secondary game comprising selecting a player number responsive to a first criterion associated with a player of the wagering game; detecting an occurrence of a trigger event; generating a random match number by a random number generator in response to the trigger event; and providing, if the match number is equal to the player number, a benefit to the player.

According to another example, a player walks up to a gaming machine and inserts his player tracking card into the gaming machine's player tracking card reader. Next, the player inserts a $100 bill into the gaming machine's bill validator. After beginning his gaming session (a trigger event), the gaming machine's CPU generates a match number from its random number generator and compares the number to the last two digits of the player's current credit meter balance (a player number). For example, the gaming machine's random number generator generates the number 99 and compares this match number to the player's current credit balance. Because the random match number matches the number of the player's current credit balance, i.e., the last two digits of the player's current credit meter balance is 99, the player wins and is awarded a bonus.

Players may find the invention enjoyable because of the excitement of having a bonus determined based on a random number and the anticipation of winning a prize. The invention may also motivate players to play more games, thereby resulting in increased revenues for a casino or slot machine proprietor, licensee or operator.

Another advantage is that many players of slot machines and other gaming devices may already be familiar with one or more aspects of some embodiments described herein in the context of pinball machines. It is highly likely that many of the most devoted patrons of gaming devices played pinball machines when they were growing up. Until now, there has been no attempt to adapt or translate this feature of these classic pinball machines to other types of gaming devices, particularly gaming devices operable to facilitate a wagering game.

An advantage for a casino or other operator, licensee or operator of a gaming device employing embodiments described herein is increased player retention. Players are likely to play for longer periods of time due to the potential of receiving a match, i.e., the potential of additional winnings, as well as the nostalgia and entertainment value of experiencing a bonus matching feature at the gaming machine. Another advantage for the casino is increased player volume. Players will be more willing to come to a casino that has gaming devices having features described herein than to casinos that do not. An advantage for the player is increased satisfaction and enjoyment from the additional chances to win due to the secondary game, and from the actual winnings from the secondary game.

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary, a variety of optional components are described to illustrate the wide variety of possible embodiments described herein.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments described herein need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, GSM, CDMA, EDGE and EVDO.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent example information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of embodiments described herein. In addition, the databases may, in a known manner, be stored locally or remotely from a device that accesses data in such a database.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The term "gaming device" may be a machine that enables a player to play a wagering game, or a game of chance. Examples of gaming devices include slot machines, video poker terminals, personal computers facilitating a wagering game program, portable computing devices facilitating a wagering game program, video blackjack machines and pachinko machines. Devices or components associated with an electronic or smart table supporting a table game, including the Rapid Table Games™ system from ShuffleMaster™, the DTS-X Table™ from DigiDeal™, Bally Table Management Systems (TMS)™, the Gold Club™ Black Jack table, and the G3™ table system from DEQ Systems™, may also be considered gaming devices (as may be the electronic or smart tables themselves)."

The term "trigger" may refer to an event or condition upon the occurrence of which a secondary game may be initiated or a bonus may be provided to a player. According to one embodiment, a comparison may be performed in response to a trigger (e.g., a displayed number may compared to a random number; a player number may be compared to a random number).

The term "player number" may be a number that is selected for comparison to another number, e.g., a match number (described below). A player number may be based on one or more criteria, including player characteristics (e.g., a personal number, described below) or device characteristics, for example. A player number may also be generated randomly or semi-randomly, if desired. The player number may be a displayed number (described below), i.e., displayed to a player at or in association with one or more gaming devices.

The term "match number" may be a number that is selected for comparison to another number, e.g., a player number (described above). The match number may be based on one or more criteria, e.g., a personal number (described below) or a display number (described below) or may be generated randomly or semi-randomly.

The term "displayed number" may refer to a number that is displayed by or in association with one or more gaming devices. The displayed number may be part of a displayed criterion associated with the device. Examples of displayed criteria include: a credit balance on the gaming device, a progressive jackpot value (which may be displayed at the gaming device or at a separate display associated with one or more gaming devices), or a comp point balance. The displayed number may include all or part of the displayed criterion: for example, if a player's displayed credit meter balance is $376 (the displayed criterion), the displayed number may be 376, 76 (the last two digits), or 37 (the two most significant digits), etc.

The term "personal number" refers to a number that is associated with one or more personal criterion of a player. Examples of personal criteria include: a player's birthday, age, social security number, driver's license number, home telephone number, license plate number, and player tracking card number. The personal number may be all or a portion of a number associated with the criterion: for example, if a player's birthday is Oct. 16, 1976 (a personal criterion), the personal number associated with that criterion may be 1016, 101676, 10161976 or 161076, etc. A given personal number may be used as a player number or a match number. A personal number may also be a displayed number; for example, a displayed credit meter balance of $376 may be both a personal number and a displayed number.

The term "match," when used as a noun, refers to an affirmative comparison; in the context of the embodiments described herein, a match generally refers to an affirmative comparison between a player number and a match number. For example, a "match" may occur if a random number "76" (a match number) is compared to a displayed number "76" (a player number) because the two numbers are equal. An affirmative comparison may also include a determination that two numbers are within a predetermined range of each other, that one is greater than or less than the other, that the two numbers are not equal, that they share one or more characteristics, e.g., a particular digit, or a particular digit (or digits) at a particular position.

The term "match," when used as a verb, means to compare affirmatively. For example, a random number "76" may "match" a displayed number "376" because the last two digits of the displayed number are equal to the random number. Other examples of affirmative comparisons are described above.

The term "bonus" refers to consideration that may be provided to a player based on a comparison (e.g., a comparison of a random number to a displayed number), trigger or secondary game result. Examples of bonuses include: money, alternate currencies (e.g., comp points, frequent flier miles, discounts, rebates, merchant-redeemable "bucks" or points), free rounds of a game, entry into a bonus round, products, and services.

FIG. 1 illustrates a flow chart of the methodology 100 of one or more embodiments. Following the start of the process 150, it may be determined whether a trigger has occurred 160. If a trigger has not occurred, the process may be restarted 150. If a trigger has occurred, a player number may be selected 161 (based on a first criterion, if desired) and a match number may also be selected 162 (based on a second criterion, if desired). It may then be determined whether the match number meets a third criterion with respect to the player number 170. If the match number does not meet the third criterion with respect to the player number, the process may be restarted 150. If the match number meets the third criterion with respect to the player number, a bonus may be awarded 175.

Figure 2:
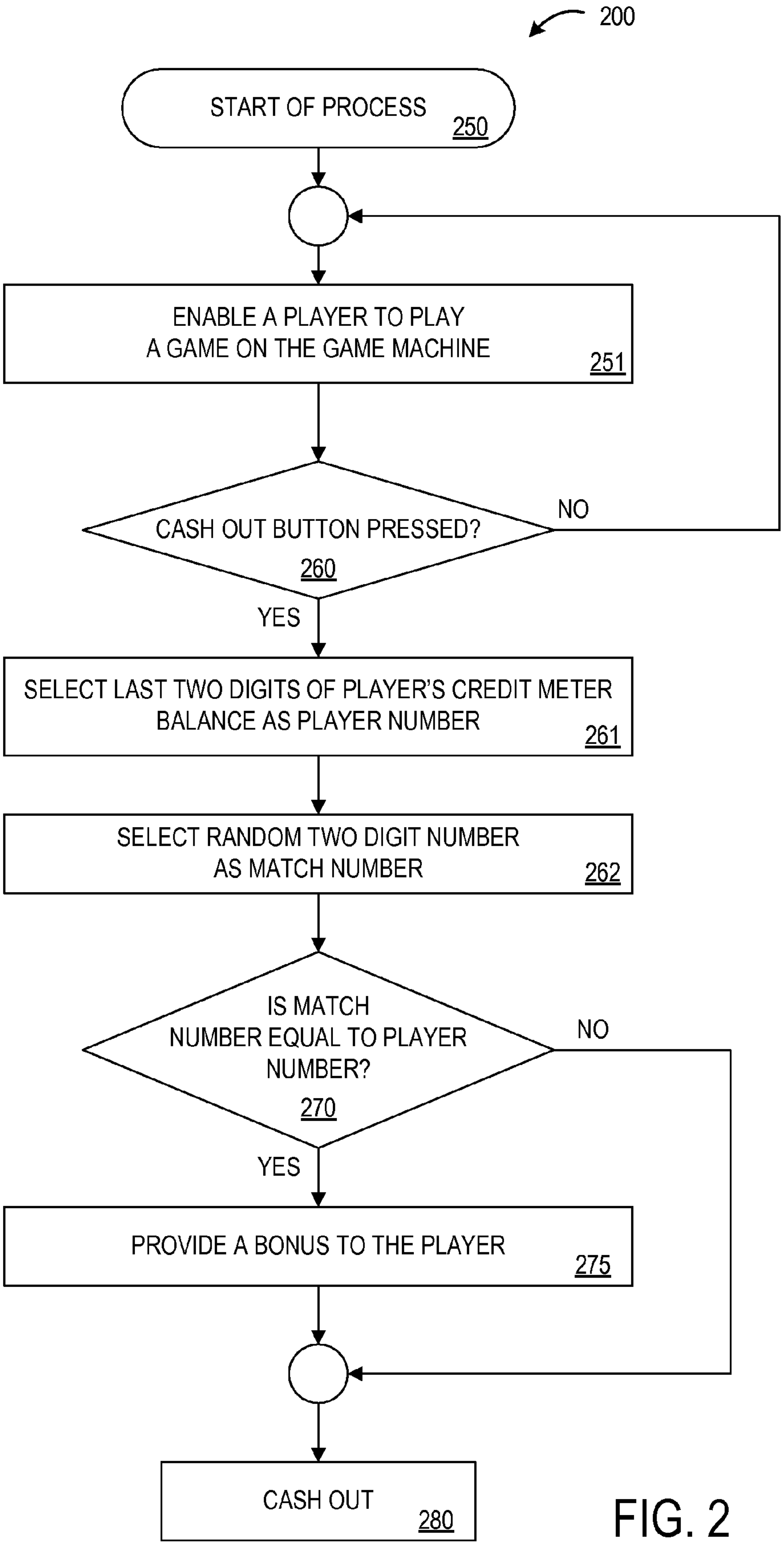
FIG. 2 illustrates a flow chart of an example embodiment of the methodology of the present invention.

An example of the methodology employing a number of specific features above is illustrated in FIG. 2. Following the start of the process 250, which may be it may be determined whether a cash out has been requested 260. If a cash out has not been requested, the process may be restarted 250. If a cash out has been requested, a credit meter number may be selected 261 (based on the dollar amount of the player's credit meter balance) and a match number may also be selected 262 (based on a random number generated by a random number generator). It may then be determined whether the random match number is equal to the player number 270. If the match number is not equal to the player number, the process may be restarted 250. If the match number is equal to the player number, a bonus may be awarded 275.

It should be noted that the order of steps of these embodiments may be changed, and that individual steps may be added, removed or combined as desired. For example, determining a player number may include prompting the player to enter a personal number, such as a credit card number, social security number or lucky number. The process may also include a prompt to the player to verify that a match number matches a personal number, such as a credit card number, social security number or other number for which privacy is a concern. The process may also include a step for verifying the player's indication that a match has occurred, and an option to penalize the player if the verification step indicates that the player has been dishonest.

Figure 3:
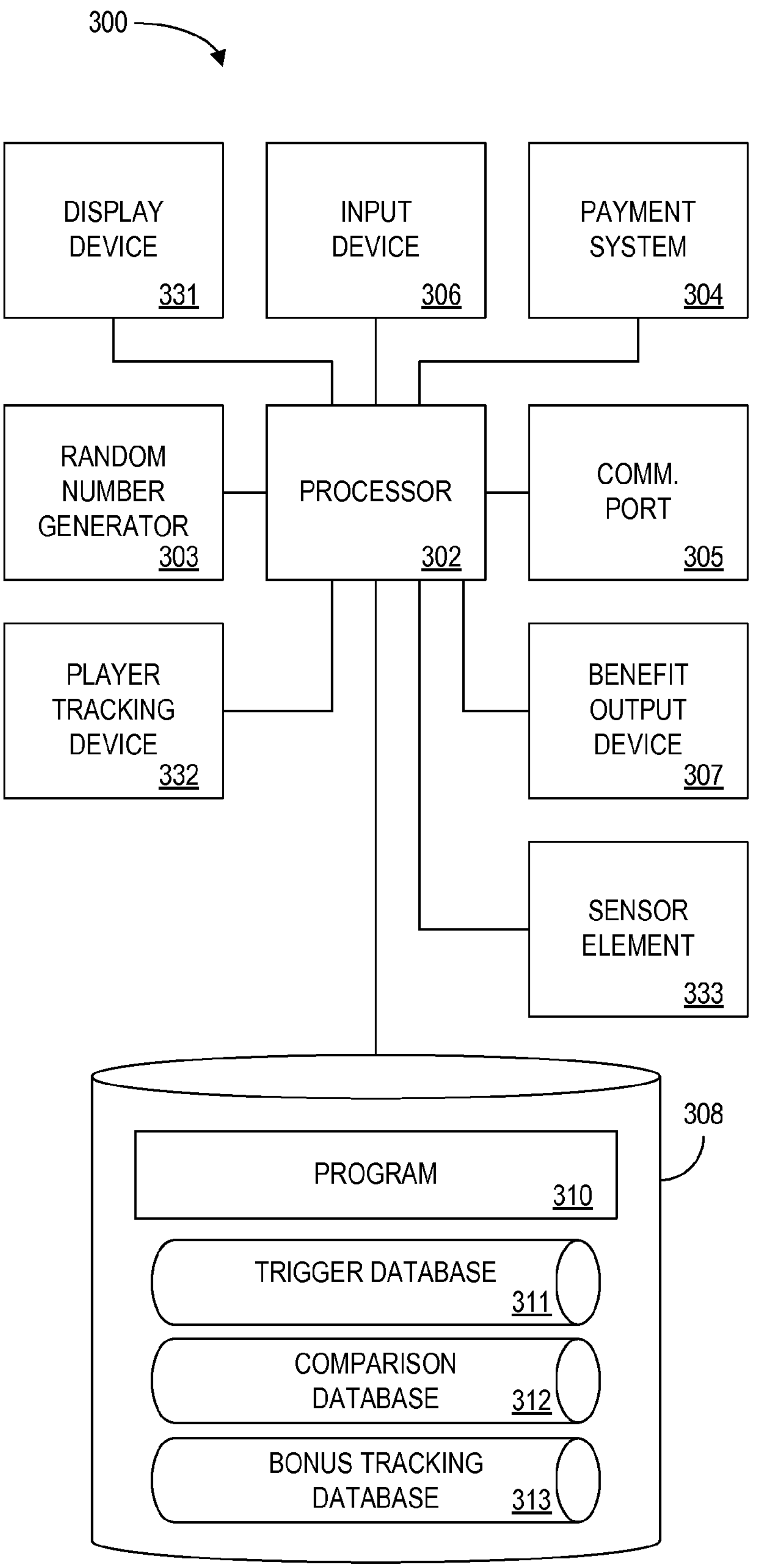
FIG. 3 illustrates a block diagram of a system of devices adapted for use in a gaming establishment that facilitates use of some of the embodiments of the present invention.

FIG. 3 illustrates a block diagram of gaming device 300 in accordance with an example embodiment. The gaming device 300 comprises processor 301 in communication with a memory 302, a random number generator 303, a payment system 304, at least one communications port 305, at least one input device 306, at least one benefit output device 307 and a data storage device 308. The data storage device 308 includes a program 310 comprising a trigger database 311, a comparison database 312, and a bonus tracking database 313. The gaming device 300 may also include a display device 331, player tracking device 332 and one or more sensor elements 333. Applicants note that other embodiments may include different elements from different embodiments disclosed herein, that not all of these elements are required for all embodiments, and that other elements may be selectively included, excluded or combined with each other.

The processor 301 may be a central processing unit or CPU. The memory 302 may be RAM or ROM. The random number generator 303 may be capable of generating random numbers, or other random or pseudo-random outcomes that may be used in determining bonuses to provide to players. The at least one communication port 305 is operable to facilitate communication with a computer server using a network.

The processor 302 is also operable to communicate with a benefit output device 307, which may be a component of gaming device 300. The benefit output device 307 may comprise one or more devices for outputting a benefit to a player of the gaming device 300. For example, in one embodiment the gaming device 300 may provide coins and/or tokens as a benefit. In such an embodiment the benefit output device 307 may comprise a hopper and hopper controller, for dispensing coins and/or tokens into a coin tray of the gaming device 300.

In another example, the gaming device 300 may provide a receipt or other document on which there is printed an indication of a benefit (e.g., a cashless gaming receipt that has printed thereon a monetary value, which is redeemable for cash in the amount of the monetary value). In such an embodiment the benefit output device 307 may comprise a printing and document dispensing mechanism. In yet another example, the gaming device 300 may provide electronic credits as a benefit (which, e.g., may be subsequently converted to coins and/or tokens and dispensed from a hopper into a coin tray). In such an embodiment the benefit output device 307 may comprise a credit meter balance and/or a processor that manages the amount of electronic credits that is indicated on a display of a credit meter balance. The processor may be the processor 302 or another processor. In yet another example, the gaming device 300 may credit a monetary amount to a financial account associated with a player as a benefit provided to a player. The financial account may be, for example, a credit card account, a debit account, a charge account, a checking account, and/or a casino account. In such an embodiment the benefit output device 307 may comprise a device for communicating with a server on which the financial account is maintained.

Note that, in one or more embodiments, the gaming device 300 may include more than one benefit output device 307 even though only one benefit output device is illustrated in FIG. 3. For example, the gaming device 300 may include both a hopper and hopper controller combination and a credit meter balance. Such a gaming device may be operable to provide more than one type of benefit to a player of the gaming device. A single benefit output device 307 may be operable to output more than one type of benefit. For example, a benefit output device 307 may be operable to increase the balance of credits in a credit meter and communicate with a remote device in order to increase the balance of a financial account associated with a player.

The at least one input device 306 may be a device that may be used to receive an input from a player. Examples of input devices 306 include: a computer keyboard, a computer mouse, a touch screen, a microphone, a video camera, a magnetic stripe reader (e.g., to read a player tracking card), a biometric input device (e.g., a fingerprint or retinal scanner), an radio antenna (e.g., for receiving inputs from a second slot machine), a weight/pressure sensor, a motion sensor, a location sensor (e.g., a global positioning system card), a voice recognition module, a coin or bill acceptor. Input devices C06 may also include: a button on a video poker machine, a lever on a slot machine, a touch screen on a video poker machine, a magnetic stripe reader to read a player tracking card inserted into a slot machine, or a motion sensor to determine if a player is standing in front of a gaming device.

The payment system 304 may perform at least one of two primary functions: accepting payment from a player (e.g., a bet); and providing payment to a player (e.g., a payout). It should be noted that payment is not limited to money but may also include other types of consideration, including products, services, and alternate currencies (e.g., casino chips). In addition, payment may be received or provided in a variety of ways, including hard currency (e.g., bills or coins), vouchers (e.g., a cashless gaming receipt), alternate currencies (e.g., casino tokens), or by crediting or debiting a player account (e.g., a bank account, credit card account, casino credit account, or other financial account).

The gaming device 300 may be capable of selectively enabling or disabling specific features, including features relating to embodiments described herein. For example, a mode in which a player may receive a bonus based on a comparison of a random number to a displayed number may be selectively enabled or disabled (e.g., by a player, by a casino employee, by a gaming device manufacturer). Other examples of features that may be selectively enabled or disabled on a gaming device include, for example: "auto-play mode," a mode in which the gaming device automatically places bets on behalf of a player; and "3D graphics mode," a mode in which graphics on the gaming device are enhanced to appear three-dimensional. Embodiments which include an "auto-play mode" are described in detail in related U.S. application Ser. No. 08/774,487, "AUTOMATED PLAY GAMING DEVICE," which issued as U.S. Pat. No. 6,012,983, and U.S. application Ser. No. 09/879,299, "SYSTEM AND METHOD FOR AUTOMATED PLAY OF MULTIPLE GAMING DEVICES," which issued as U.S. Pat. No. 6,634,942, both of which are hereby incorporated by reference. According to one embodiment, a player may provide consideration (e.g., money, comp points) in order to enable or disable a feature on a gaming device. For example, a player may pay $10.00 at the start of a session to enable Pinball Matching Mode on a selected slot machine. According to another embodiment, a feature may be enabled or disabled by indicating a code (e.g., a numeric code, and alphanumeric code) to the gaming device. Embodiments which include a GUI capable of enabling and disabling features on a gaming device are described in detail in related U.S. application Ser. No. 10/419,478, "METHOD AND APPARATUS FOR ENABLING A PLAYER TO SELECT FEATURES ON A GAMING DEVICE," which published as US-2004-0005919-A1.

The program 310 may additionally control other operations of the gaming device, e.g., the primary wagering game. The trigger database 311 may be used to identify triggers that may cause the gaming device (or associated device, such as a controller or server) to perform a comparison. The comparison database 312 may describe various methods of comparing a displayed number to a random number and providing a bonus to a player based on the comparison. The bonus tracking database may track bonuses that have been provided. The program 310 and associated databases 311, 312, 313 may be stored on separate storage media, and may be shared or accessed separately across a network.

FIGS. 4A-4D illustrate a plan view of a gaming device 400 at various steps of an embodiments of the present invention. The slot machine 400 may be a gaming device, for example, as illustrated in FIG. 3. In the embodiment, the gaming device 400 comprises a three reel slot machine. The slot machine 400 comprises a display area 405 in which an outcome for a game of the slot machine is displayed to the player. The display area 405 may, for example, be a video display that displays simulations of reels. The display area 405 may, in another example, be glass behind which are located mechanical reels. Display area 405 is an example embodiment of the display device 331, described with respect to FIG. 3.

Within display area 405 is a payline 415. In accordance with some embodiments of the present invention, an outcome of a game is a set of symbols displayed along a payline of a reeled slot machine.

Slot machine 400 further comprises a handle 422. A player may initiate the movement of the reels in display area 405 by pulling on the handle 422. Alternatively, a player may initiate the movement of the reels in display 405 by actuating the start button 464. Either or both of handle 422 and start button 464 are example embodiments of the input device 306, described with respect to FIG. 3.

Slot machine 400 further comprises a cash out button 465. By pressing the button 465, a player may withdraw the credit meter balance 431; the withdrawal may comprise coins, tokens, cash or a cashless gaming receipt redeemable for the balance, or a combination thereof.

Slot machine 400 also comprises a player tracking device 472, which is an example of the player tracking device 332 that was described with respect to FIG. 3. The player tracking device 472 may comprise a player tracking card reader and a display (e.g., an LED display) for outputting information related to the player identifier (e.g., player's name and number of comp points associated with player's account).

The slot machine 400 may include additional displays, such as a match number display area 435 and message display area 440, for outputting information to a player. The display area 435 may be utilized, for example, to display a match number to a player. The display area 440 may be utilized, for example, to inform a player that he has qualified for a bonus, e.g., based in part on the match number. It should be noted that the number of displays in this embodiment is by way of example only, and that information included on various displays (e.g., 405, 428, 431, 435, 440, etc.) may be displayed on a single display or on different groups of displays.

Payment system 474 may comprise a bill acceptor and/or credit card reader 476, and a coin acceptor 448. A player may utilize payment system 474 to provide a wager for playing a game. The payment system 472 is an example of the payment system 304 that was described with respect to FIG. 3.

Slot machine 400 further comprises a credit meter balance display 431, which is an example embodiment of a benefit output device 307 that was described with respect to FIG. 3. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player, for example, automatically or at the player's request such as by pressing the cash out button 465.

The slot machine 400 may include a payout display area 428, which displays a payout schedule of the slot machine 400. The payout schedule displays payouts that correspond to various outcomes obtainable on the slot machine 400. In one or more embodiments, if an outcome is displayed in display area 405 that, as indicated in display area 428, corresponds to a payout, the credit meter balance may be increased by an amount of electronic credits corresponding to the payout. In some embodiments, one or more of the outcomes associated with a payout in the display area 428 also have a second payout associated with the outcome in the memory of the slot machine 400. The second payout for a particular outcome will typically be greater than the payout displayed in display area 405 for the outcome. In such embodiments, if a payout that corresponds to such a second payout is displayed in display area 405, the difference between the second payout and the first payout is added to the account associated with the player.

Finally, the slot machine 400 comprises a coin tray 470. Payment to the player may be rendered by dispensing coins into the coin tray 470. Such coins may be dispensed based on, for example, a player's indication that the player would like to cash out his credit meter balance and/or a payout obtained by a player as a result of playing a game on the slot machine 400. The coin tray 400 is an example embodiment of the benefit output device 307, described with respect to FIG. 3. Note that slot machine 400 may include different and/or additional components besides those illustrated in FIG. 4A-FIG. 4D.

Figure 4A:
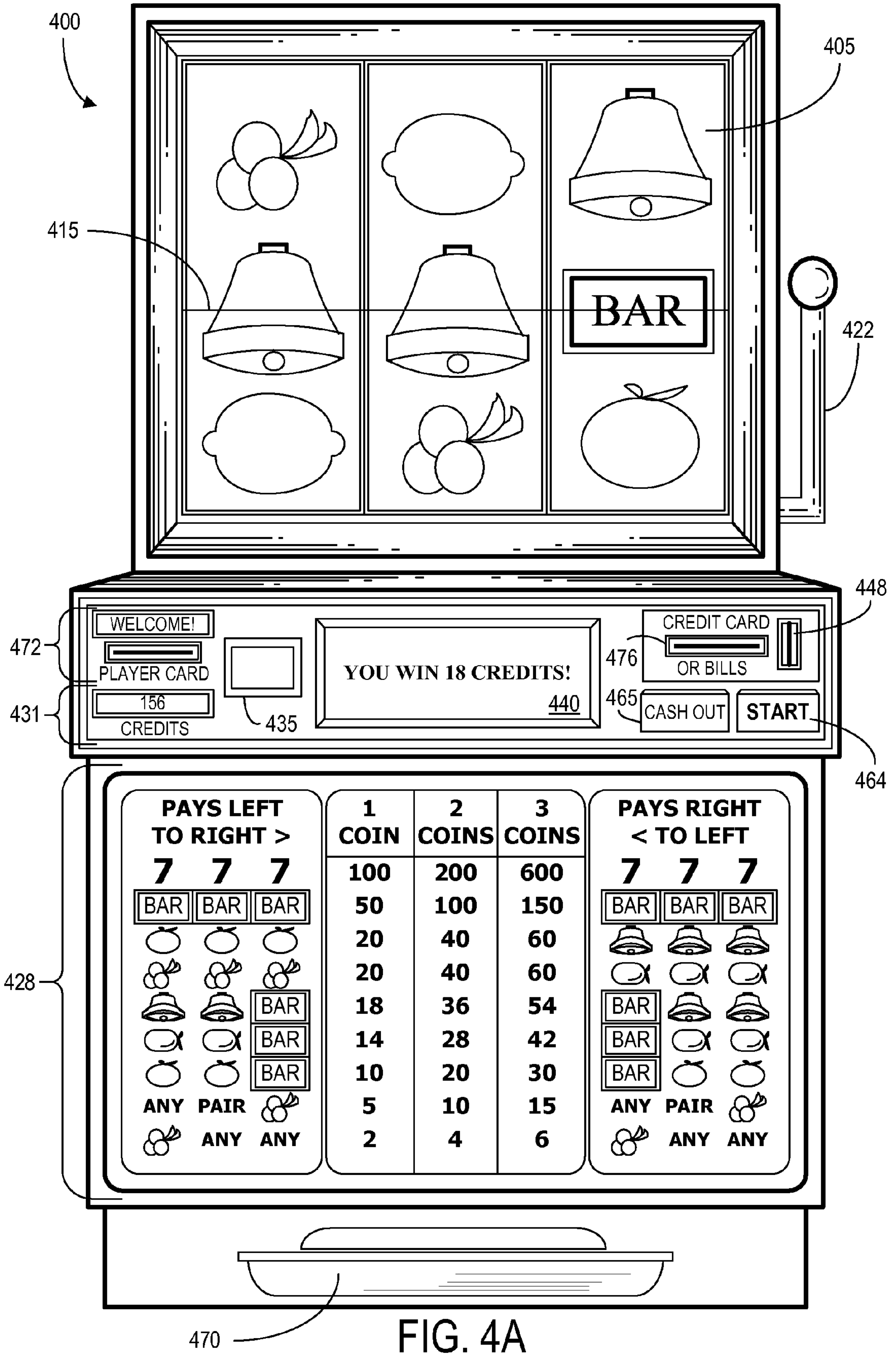
FIG. 4A illustrates a front view of a slot machine at a step of an embodiment of the present invention.

FIG. 4A illustrates a plan view of a slot machine 400 at a step of an example embodiment. The step shown in FIG. 4A may correspond to the start of the process 150 of FIG. 1, or the start of the process 250 of FIG. 2, in which a primary slot game is in progress on the slot machine 400. In this example, the reels have lined up as BELL-BELL-BAR along the payline 415, resulting in an 18 coin payout (see payout table display 428) being added to the player's credit meter balance 431. The message display 440 indicates the result to the player.

Figure 4B:
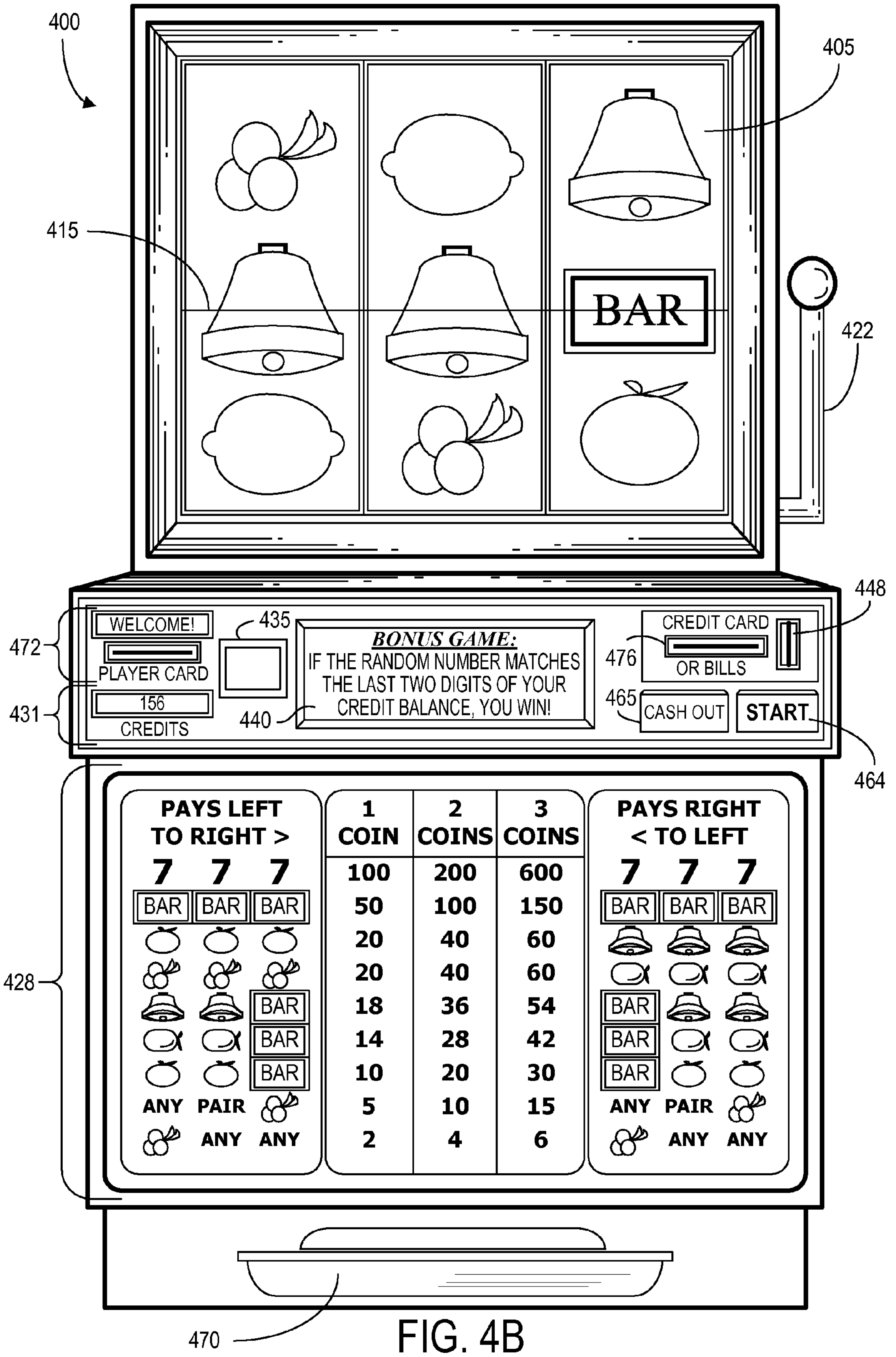
FIG. 4B illustrates a front view of a slot machine at a step of an embodiment of the present invention subsequent to the step illustrated in FIG. 4A.

FIG. 4B illustrates a plan view of a slot machine 400 at a step of the example embodiment subsequent to the step illustrated in FIG. 4A. Following the player win illustrated in FIG. 4A, the player may decide to conclude the primary slot game by pressing the cash out button 465. In this example, pressing the cash out button 465 is also a trigger for a secondary bonus game (see, e.g., step 160 of FIG. 1, and step 260 of FIG. 2). The initiation of the secondary bonus game may be indicated by the message display 440.

Figure 4C:
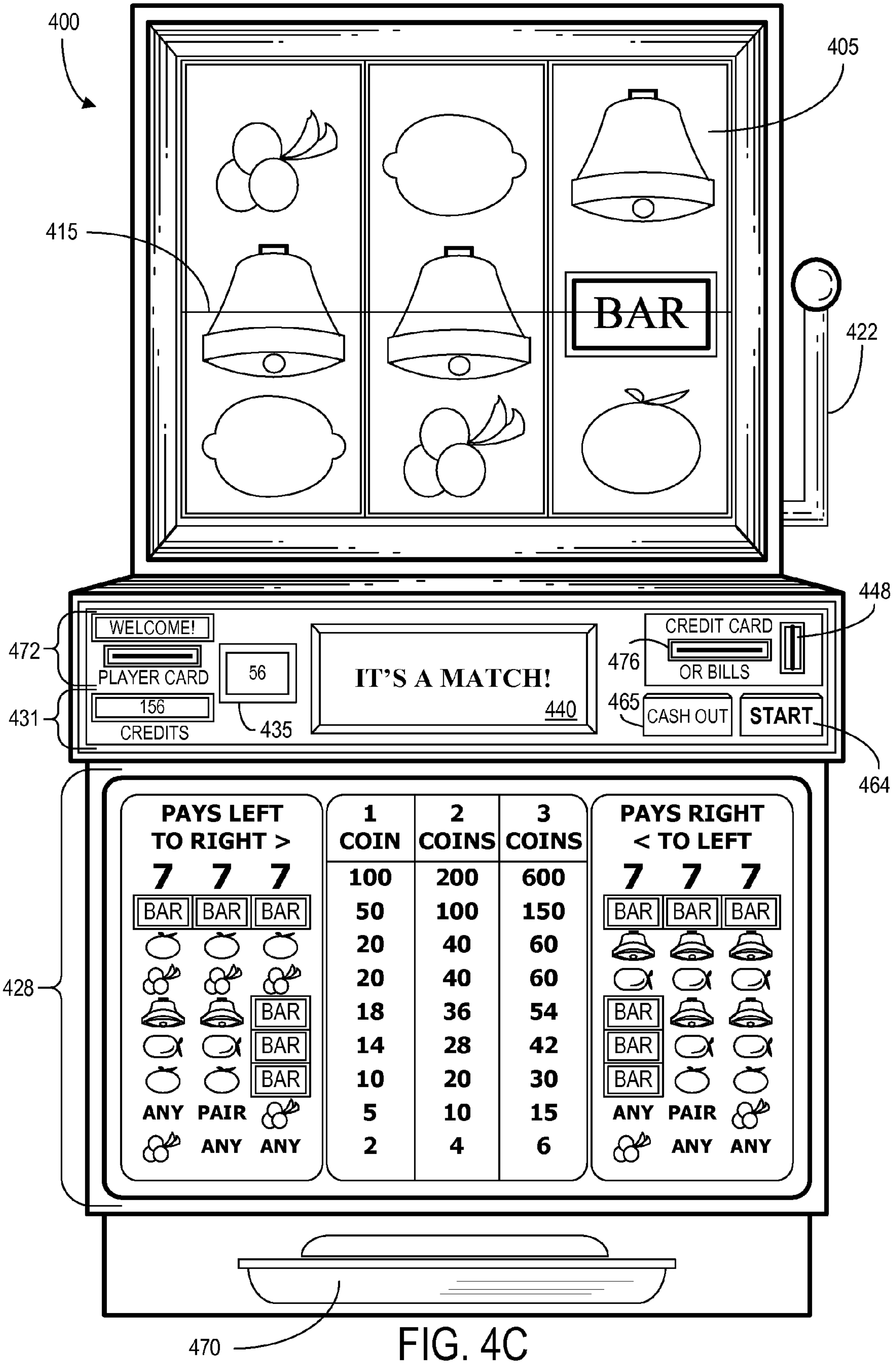
FIG. 4C illustrates a front view of a slot machine at a step of an embodiment of the present invention subsequent to the step illustrated in FIG. 4B.

FIG. 4C illustrates a front view of a slot machine 400 at a step of the example embodiment subsequent to the step illustrated in FIG. 4B. In response to the trigger, i.e., the pressing of the cash out button 465, a player number is selected based on the player's credit meter balance 431, e.g., the last two digits ("56") of the credit meter balance (see, e.g., step 161 of FIGS. 1 and 261 of FIG. 2). A match number is also selected, e.g., at random, and is displayed on the match number display 435 (see, e.g., step 162 of FIGS. 1 and 262 of FIG. 2). The match number is compared to the player number to determine whether the match number is equal to the player number; in this example, the random match number is also 56, so there is an affirmative comparison (or "match") with the player number (see, e.g., step 170 of FIGS. 1 and 270 of FIG. 2). The match is indicated on the message display 440.

Figure 4D:
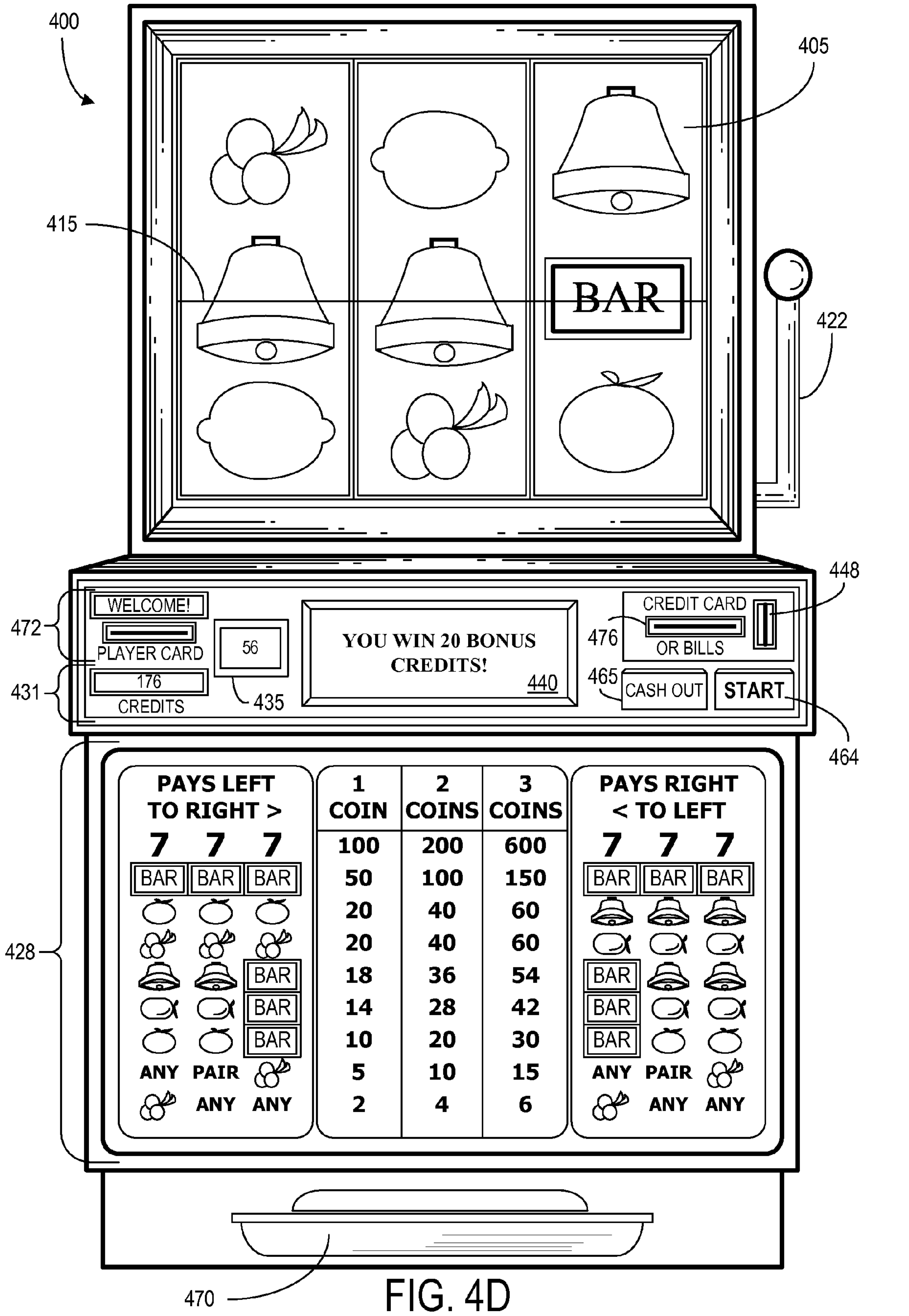
FIG. 4D illustrates a front view of a slot machine at a step of an embodiment of the present invention subsequent to the step illustrated in FIG. 4C.

FIG. 4D illustrates a front view of a slot machine 400 at a step of the example embodiment subsequent to the step illustrated in FIG. 4C. In response to the match illustrated by FIG.

4C above, a bonus may be provided to the player (see, e.g., step 175 of FIGS. 1 and 275 of FIG. 2). In this example, the bonus is an additional 20 credits.

The match number and/or other information may be alternatively displayed on the main display area 405 rather than on a separate display, e.g., 435, 440, or on any other combination of displays desired.

FIG. 5 illustrates a table representing a portion of a trigger database 511 according to one or more example embodiments. The trigger database 511 may be used to determine when to perform a comparison and determine if a match has occurred. The trigger database 511 may include a plurality of data fields, including a trigger identifier field 520 comprising a list of unique identifiers for each individual trigger, a trigger description field 521 including a list of descriptions of the respective triggers listed in the trigger identification field 520 and a comparison identifier field 530 including a list of example comparison identifiers corresponding to the comparison to be performed when a respective trigger occurs. As discussed above, the term "trigger" may be defined as an event or condition that initiates another event or process. According to the embodiment of FIG. 5, a comparison 530 may be performed in response to a trigger 520 (e.g., a displayed number may be compared to a random number, or a personal number may be compared to a random number). Rows (a)-(i) illustrate individual examples of triggers 520, trigger descriptions 521 and associated comparisons 530. In the following paragraphs, individual database cells may be referenced by both their category and row number, e.g., TRIG-123487-01, located in category 520 ("Trigger Identifier") and row (a), may be referenced as cell 520(*a*) or trigger identifier 520(*a*).

Each trigger identifier 520 is uniquely identified in the trigger database, e.g., TRIG-123487-01. The trigger descriptions 521 may alternatively be stored in a separate database. Similarly, the comparison 530 to perform in response to the triggers 520 may also alternately be stored in a separate database. A comparison 530 may be selected to be performed in response to the trigger 520, and one or more triggers 520 may be associated with specific comparisons 530 to be performed. For example, comparison COMP-012938-01 530(*a*) may be performed in response to trigger TRIG-123487-01 E20(*a*). According to one embodiment, the comparison identifiers 530 listed in this column correspond to comparison identifiers 630 listed in the comparison database 612 shown in FIG. 6, described below.

Turning now to the individual rows (a)-(i) of FIG. E, row (a) includes trigger identifier 520(*a*) (TRIG-123487-01), trigger description 521(*a*) and comparison identifier 530(*a*). Trigger 520(*a*) is described in cell 521(*a*) as [(TOTAL_SPINS % 10)=0], i.e., every tenth spin. The trigger is calculated by performing a remainder function (%) on the total number of spins (TOTAL_SPINS), i.e., the remainder of TOTAL_SPINS/10. Therefore, trigger 520(*a*) has occurred when the remainder is 0, i.e., TOTAL_SPINS/10 is an integer. When trigger 520(*a*) occurs, comparison 530(*a*) (COMP_012938-01) is performed. The conditions of comparison 530(*a*) may be found in a comparison database as described with respect to FIG. 3 and/or FIG. 6, in another database, or in the trigger database 511.

Row (b) includes trigger identifier 520(*b*) (TRIG-123487-02), trigger description 521(*b*) and comparison identifier 530(*b*). Trigger 520(*b*) is described in cell 521(*b*) as [BUTTON_PRESSED (CASH_OUT_BUTTON) AND (TOTAL_SPINS>=100)], i.e., pressing the cash out button (e.g., cash out button 465) after the player has taken 100 or more spins. Therefore, trigger 520(*b*) has occurred when a player who has taken at least 100 spins presses the cash out button. When trigger 520(*b*) occurs, comparison 530(*b*) (COMP_012938-02) is performed. The conditions of comparison 530(*b*) may be found in a comparison database as described with respect to FIG. 3 and/or FIG. 6, in another database, or in the trigger database 511. Variations on trigger 520(*b*) include detecting termination of game play by the player, initiation of a cash out function by means other than pressing a cash out button, or requiring a different minimum number of spins.

Row (c) includes trigger identifier 520(*c*) (TRIG-123487-03), trigger description 521(*c*) and comparison identifier 530(*c*). Trigger 520(*c*) is described in cell 521(*c*) as [EVENT (CASH_INSERTED) AND (VALUE_OF_CASH_INSERTED>=$20.00], i.e., inserting a paper bill having a value of $20 or more. When trigger 520(*c*) occurs, comparison 530(*c*) (COMP_012938-03) is performed. The conditions of comparison E30(*c*) may be found in a comparison database as described with respect to FIG. 3 and/or FIG. 6, in another database, or in the trigger database 511. Variations on trigger 520(*c*) may include detecting the insertion of a total amount of cash within a given time range, e.g., detecting the insertion of at least $20 worth of $1, $5 and $10 bills within one minute of inserting the first bill, and determining or detecting the insertion of a cashless gaming receipt or a debit or credit card transaction at or above a predetermined amount.

Row (d) includes trigger identifier 520(*d*) (TRIG-123487-04), trigger description 521(*d*) and comparison identifier 530(*d*). Trigger 520(*d*) is described in cell 521(*d*) as [(RATE_OF_PLAY>10 COINS/MINUTE) AND ((DURATION_OF_SESSION_IN_MINUTES) % 5)=0)], i.e., determining, once every five minutes, whether a rate of play exceeds 10 coins (or credits) per minute. When trigger 520(*d*) occurs, comparison 530(*d*) (COMP_012938-04) is performed. The conditions of comparison 530(*d*) may be found in a comparison database as described with respect to FIG. 3 and/or FIG. 6, in another database, or in the trigger database E11. Variations on trigger 520(*d*) may include detecting a rate of play based on spins per minute, and may also be based on a rate of play over a specified period of time, such as in the last five minutes, since the start of a gaming session, or over the entire history of a player's tracking account.

Row (e) includes trigger identifier 520(*e*) (TRIG-123487-05), trigger description 521(*e*) and comparison identifier 530(*e*). Trigger 520(*e*) is described in cell 521(*e*) as [OUTCOME_DISPLAYED (BAR-BAR-CHERRY)], i.e., a primary slot game outcome of BAR-BAR-CHERRY. When trigger 520(*e*) occurs, comparison 530(*e*) (COMP_012938-05) is performed. The conditions of comparison 530(*e*) may be found in a comparison database as described with respect to FIG. 3 and/or FIG. 6, in another database, or in the trigger database 511. Variations on trigger 520(*e*) may include detecting or determining any game outcome based on any observable game parameters.

Row (f) includes trigger identifier 520(*f*) (TRIG-123487-06), trigger description 521(*f*) and comparison identifier 530(*f*). Trigger 520(*f*) is described in cell 521(*f*) as [TIME_OF_DAY ((1200) OR (1400) OR (1600) OR (1800))], i.e., at 12:00, 2:00, 4:00 and 6:00 PM. When trigger 520(*f*) occurs, comparison 530(*f*) (COMP_012938-06) is performed. The conditions of comparison 530(*f*) may be found in a comparison database as described with respect to FIG. 3 and/or FIG. 6, in another database, or in the trigger database 511. Variations on trigger 520(*f*) include determining or detecting whether a predetermined amount of time has passed since an event, such as beginning a gaming session or a player win or loss, has occurred.

Row (g) includes trigger identifier 520(*g*) (TRIG-123487-07), trigger description 521(*g*) and comparison identifier 530 (*g*). Trigger 520(*g*) is described in cell 521(*g*) as [(WINNING_OUTCOME) AND (PRIZE_VALUE>$10)], i.e., a game win of more than $10. When trigger 520(*g*) occurs, comparison 530(*g*) (COMP__012938-07) is performed. The conditions of comparison 530(*g*) may be found in a comparison database as described with respect to FIG. 3 and/or FIG. 6, in another database, or in the trigger database 511. Variations on trigger 520(*g*) may include detecting a group of wins in a row, over a predetermined number of spins, within a session, or detecting a total win over an entire session which meets or exceeds a predetermined amount.

Row (h) includes trigger identifier 520(*h*) (TRIG-123487-08), trigger description 521(*h*) and comparison identifier 530 (*h*). Trigger 520(*h*) is described in cell 521(*h*) as [(RATE_OF_ PLAY (BANK_OF_GAME_MACHINES). 100 COINS/MINUTE) AND (DURATION_OF_SESSION_IN-_SECONDS % 60)], i.e., determining, once every minute, whether a rate of play of an entire bank of game machines exceeds 100 coins (or credits) per minute. When trigger 520 (*h*) occurs, comparison 530(*h*) (COMP__012938-08) is performed. The conditions of comparison 530(*h*) may be found in a comparison database as described with respect to FIG. 3 and/or FIG. 6, in another database, or in the trigger database 511. Variations on trigger 520(*h*) may include detecting a rate of play of one or more game machines within the bank of game machines which may or may not include the game machine which is facilitating the primary and/or secondary games.

Row (i) includes trigger identifier 520(*i*) (TRIG-123487-09), trigger description 521(*i*) and comparison identifier 530 (*i*). Trigger 520(*i*) is described in cell 521(*i*) as [(PLAYER_ TRACKING_CARD_INSERTED) AND (OUTCOME_ DISPLAYED)], i.e., after every slot machine spin, so long as the player's player tracking card is inserted in the machine. When trigger 520(*i*) occurs, comparison 530(*i*) (COMP__ 012938-06) is performed. In this example, comparisons 530 (*f*) and 530(*i*) are the same comparison, but are performed in response to different triggers (520(*f*) and 520(*i*), respectively). The conditions of comparison 530(*i*) may be found in a comparison database as described with respect to FIG. 3 and/or FIG. 6, in another database, or in the trigger database 511. Variations on trigger 520(*i*) may include any game event, and may or may not be dependent on a player action or condition.

Other embodiments include random or semi-random trigger events, either in response to a randomly generated number, or based on other internal or external criteria which may be detected or determined by the game machine or associated device.

According to some embodiments, a description of a trigger 521 may be a Boolean expression. In such an embodiment, the trigger may occur if the Boolean expression is true. A Boolean expression may reference one or more variables or factors and may include Boolean modifiers and conjunctions (e.g., AND, OR, XOR, NOT, NAND), comparators (e.g., >, <, =, >=, <=, !=), mathematical operations (e.g. +, –, *, /, modulus, mean, standard deviation, logarithm, derivative, integral), and constants (e.g. $10, 20 coins, 300 credits, 0.02, 15%, pi, TRUE, yellow, "raining").

According to other embodiments, a trigger may occur based on any event or condition. For example, a trigger may occur in response to a player inserting a coin into the gaming device 400 of FIG. 4A-FIG. 4D, or in response to the gaming device 400 displaying an outcome to a player. Other events and conditions that may be used as potential triggers include registering for a player tracking card, inserting his player tracking card into the gaming device, placing a bet, indicating a bet value (e.g., a number of coins to bet on a spin of a slot machine or indicating a maximum bet), requesting a complimentary product or service (e.g., a player presses a "change request" button on the gaming device), or activating or deactivating a feature on the gaming device (e.g., 3D graphics mode, auto-play mode, reverse odds mode). For example, a trigger may occur every minute as long as a player operates the gaming device in auto-play mode. Other examples of possible triggers include removing a player tracking card from a player tracking card reader on the gaming device, a player identifying himself (e.g., by typing his home telephone number into a numeric keypad on the gaming device), a player indicating a preference or providing information about himself (e.g., a trigger may occur if a player answers a survey question between spins on a slot machine), or a player accepting or rejecting a cross-subsidy offer (e.g., a trigger may occur if a player accepts a cross-subsidy offer that offers him 10 coins for answering 10 survey questions). Embodiments which include cross-subsidy offers are described in detail in related U.S. application Ser. No. 08/769,085, "SLOT MACHINE ADVERTISING/SALES SYSTEM AND METHOD," which issued as U.S. Pat. No. 6,186,893 and U.S. application Ser. No. 10/121,243, "METHODS AND SYSTEMS FOR FACILITATING PLAY AT A GAMING DEVICE BY MEANS OF THIRD PARTY OFFERS," which issued as U.S. Pat. No. 7,094,149, both of which are hereby incorporated by reference. Other triggers may include a player purchasing a product or service, or a player transmitting a message such as an email or text message.

Actions by casino employees (e.g., a cocktail waitress, a coin change provider) may also serve as triggers. For example, a cocktail waitress may press a button on a two-way pager to indicate that she has provided a drink to a player. In a second example, a casino employee may notice that a player seems discouraged and indicate that a trigger should occur, in the hope that the chance of winning a bonus may cheer the player up. Note that casino employees may provide indications using a variety of different electronic devices (e.g., wireless electronic devices, input devices on gaming devices). Other possible triggers may include reservations by a player (e.g., a dinner reservation at a restaurant associated with the casino), habits or preferences of a player such as a player's favorite game symbol (e.g., a pink bunny rabbit) displayed on the reels of a slot machine. According to another embodiment, a determination that a player is dissatisfied may be a trigger. Events such as a player experiencing a losing outcome or a losing streak, for example, may indicate dissatisfaction. The determination may be made by the gaming device, by the server, or by another device such as a camera, microphone and/or software configured to detect stress, anger, unhappiness or other signs of dissatisfaction. The determination may also be made by a casino employee or agent, and may also be based on external criteria not associated with the game machine. For example, if a player is irritated by nearby cigarette smoke, or if the player is exhibiting signs of fatigue or anger, detection or determination of this condition may be a trigger.

FIG. 6 illustrates a table representing a portion of a comparison database 612 according to one or more example embodiments. The example comparison database 612 may include a plurality of data fields, including a comparison identifier field 630 comprising a list of unique identifiers for each individual comparison, a player number definition field 661 comprising a list of player number definitions, a player number description field 631 comprising a list of descriptions of the respective player number definition a match number definition field 662 comprising a list of match number definitions, a match number description field 632 comprising a list of descriptions of the respective match number definitions 661, a method of comparison field 633 comprising a list of descriptions of comparisons of the respective player numbers 661 and match numbers 662, and a bonus field 640 comprising a bonus or other benefit to be provided if the respective comparison 633 is fulfilled.

Each player number definition 661 and match number definition 662 is uniquely identified in the comparison database, along with their respective descriptions, 631, 632. Player number definitions 661 and descriptions 631 may describe personal numbers and/or displayed numbers, described above, as desired. Match number definitions 661 and descriptions 631 may also describe personal numbers and/or displayed numbers, as desired. In addition, the player number definitions 661 and/or descriptions 631 may be stored in a separate database, as may the match number definitions H62 and/or descriptions 632. The bonus 641 may also be selected from a separate database.

Turning now to the individual rows (a)-(h) of FIG. 6, row (a) includes comparison identifier 620(*a*) (COMP-012938-01), which may correspond to comparison 530(*a*) described above with respect to FIG. 5. Row (a) may also include player number definition 661(*a*) (PLAYER=CREDIT_BALANCE) and description 631(*a*) (a player's current credit meter balance), match number definition 662(*a*) [MATCH=RANDOM (MIN=0, MAX=99)] and description (a random integer between 0 and 99). The method of comparison 633(*a*) is (PLAYER % 100)=MATCH, i.e., (CREDIT BALANCE % 100)=RANDOM (MIN=0, MAX=99). Put another way, if the last two digits of the player's credit meter balance (the remainder of the credit meter balance divided by 100) are equal to a randomly selected number between 0 and 99, the comparison H33(*a*) is affirmative and a bonus 641(*a*) (3 coins in this example) is provided.

Row (b) includes comparison identifier 620(*b*) (COMP-012938-01), which may correspond to comparison 630(*b*) described above with respect to FIG. 5. Row (b) may also include player number definition 661(*b*) [PLAYER=GAMES_PLAYED] and description 631(*b*) (games played in the current session), match number definition 662(*b*) [MATCH=RANDOM (MIN=0, MAX=9)] and description (a random integer between 0 and 9). The method of comparison H33(*b*) is TENS_DIGIT (PLAYER)=MATCH, i.e., TENS_DIGIT(GAMES_PLAYED)=RANDOM (MIN=0, MAX=9). Put another way, if the tens digit of the number of games played in the present session is equal to a randomly selected number between 0 and 9, the comparison 633(*b*) is affirmative and a bonus 641(*b*) (a coupon for a movie ticket in this example) is provided.

Row (c) includes comparison identifier 620(*c*) (COMP-012938-03), which may correspond to comparison 530(*c*) described above with respect to FIG. 5. Row (c) may also include player number definition H61(*c*) [PLAYER=JACKPOT_VALUE] and description 631(*c*) (the current value of a progressive jackpot), match number definition 662(*c*) [MATCH=RANDOM (MIN=0, MAX=999)] and description (a random integer between 0 and 999). The method of comparison 633(*c*) is (PLAYER % 1000)=MATCH. If the last three digits of the progressive jackpot value is equal to a randomly selected number between 0 and 999, the comparison 633(*b*) is affirmative and a bonus 641(*c*) (automatic entry into a progressive jackpot bonus round in this example) is provided.

Row (d) includes comparison identifier 620(*d*) (COMP-012938-04), which may correspond to comparison 530(*d*) described above with respect to FIG. 5. Row (d) may also include player number definition 661(*d*) [PLAYER=BIRTHDAY (0, 366)] and description 631(*d*) (the players, birthday where January 1=1 and December 31=366), match number definition 662(*d*) [MATCH=RANDOM (DAYS_OF_YEAR (0, 366))] and description (a random integer between 0 and 999). Alternatively, the match number definition 662(*d*) may simply be [MATCH=RANDOM (0, 366)] or a random integer between 1 and 366. The method of comparison 633(*d*) is PLAYER=MATCH. If the numerical representation of the player's birthday (an integer from 1 to 366) is equal to a randomly selected number between 1 and 366, the comparison 633(*d*) is affirmative and a bonus 641(*d*) (doubling the potential jackpot payout for the next 10 minutes in this example) is provided.

Row (e) includes comparison identifier 620(*e*) (COMP-012938-05), which may correspond to comparison 530(*e*) described above with respect to FIG. 5. Row (e) may also include player number definition 661(*d*) [PLAYER=COMP_POINTS] and description 631(*e*) (a comp point balance associated with a player's account), match number definition 662(*e*) [MATCH=SSN] and description (a player's social security number). Notably, in this example, neither the player number nor match number are selected or generated randomly; as discussed above, it is possible for one, both or none of the player and match numbers to be selected or generated randomly. The method of comparison 633(*e*) is PLAYER % 1000>MATCH % 1000. If the last three digits of the player's comp points balance are greater than the last three digits of a player's social security number, the comparison 633(*e*) is affirmative and a bonus 641(*e*) (1,000 comp points in this example) is provided.

Row (f) includes comparison identifier 620(*f*) (COMP-012938-06), which may correspond to comparison 530(*f*) described above with respect to FIG. 5. Row (f) may also include player number definition 661(*f*) [PLAYER=ZIPCODE] and description H31(*f*) (a zip code of a player's mailing address), match number definition H62(*f*) [MATCH=RANDOM (ALL_ZIPCODES)] and description (a random zip code selected from a list of all current zip codes). The method of comparison 633(*f*) is PLAYER=MATCH. If the zip code of the player's mailing address is equal to the randomly selected zip code, the comparison 633(*f*) is affirmative and a bonus 641(*f*) ($10.00 in this example) is provided.

Row (g) includes comparison identifier 620(*g*) (COMP-012938-07), which may correspond to comparison 530(*g*) described above with respect to FIG. 5. Row (g) may also include player number definition 661(*g*) [PLAYER=BIRTHDAY (01/01, 12/31)] and description 631 (*f*) (a player's birthday in XX/XX format), match number definition 662(*g*) [MATCH=WEIGHTED_RANDOM (DAYS_OF_YEAR (01/01, 12/31), CURRENT_MONTH_WEIGHTED)] and description (a semi-randomly selected month with the current month weighted, and a randomly selected day from the selected month). The method of comparison 633(*g*) is PLAYER=MATCH. If the month and day of the player's birthday are equal to the semi-randomly selected month and randomly selected day of the match number, the comparison 633(*g*) is affirmative and a bonus 641(*g*) (a souvenir t-shirt in this example) is provided. In this example, players having birthdays in the current month are more likely to generate a match and win a bonus than if the match number 662(*g*) were selected purely randomly; one benefit of this embodiment is the ability to attract players to the casino on or around their birthdays.

Row (h) includes comparison identifier 620(*h*) (COMP-012938-08), which may correspond to comparison 530(*h*) described above with respect to FIG. 5. Row (h) may also include player number definition 661(*h*) [PLAYER=CREDIT_BALANCE] and description 631(*f*) (a player's credit meter balance), match number definition H62 (*h*) [MATCH=LUCKY_NUMBER] and description (a player's one or two digit lucky number). The method of comparison 633(*h*) is PLAYER % 100=MATCH. If the last two digits of the player's credit meter balance are equal to the player's one or two digit lucky number, the comparison 633(*h*) is affirmative and a bonus 641(*h*) (a free jackpot-only spin in this example) is provided. The player's lucky number may be entered by the player at the start of the session or prior to the secondary game, or may be stored as information in the player's account. Alternatively, the lucky number may be as many digits as desired, and the method of comparison may be adjusted responsive to the number of digits in the lucky number. For example, if the lucky number is three digits, the method of comparison may be modified to be PLAYER % 1000=MATCH.

Other examples of potential player numbers and/or match numbers include a jackpot value (e.g., a progressive jackpot value) which may be displayed as a number of credits (e.g., 10,000 credits) or as an amount of money (e.g., $2500), a rate of play (e.g., a average number of coins bet per minute, a number of spins per minute), described above with respect to FIG. 3, or an amount of money stored in the gaming device 300 (e.g., a total number of coins stored in the gaming device's hopper, a total value of bills stored in the gaming device's bill acceptor). According to one embodiment, a gaming device may use one or more sensors 333 (e.g., a weight sensor, an optical sensor) to determine how many coins are stored in the gaming device's hopper. Additionally, a player tracking card number, a player's driver's license number, a player's license plate number, a biometric of a player (e.g., heart rate, height, weight), a number assigned to a player (e.g., a gaming session number), a player's hotel room number (e.g., at a hotel associated with the casino), credit card number, debit card number (or other financial account identifier), calling card number, telephone number, passport number, or an expiration date of a player's credit card or driver's license may all be used as player numbers and/or match numbers according to some embodiments.

According to one embodiment, a player number and/or match number need not be displayed on a gaming device. For example, there may be privacy concerns associated with displaying a player's credit card number, hotel room, date or birth, license plate number or other associated numbers in a manner that would be visible to other players in a casino. For example, displaying a player's credit card number on a gaming device may be unwise because a passerby in a casino might be able to see this credit card number and use it to purchase products without the player's permission.

According to some embodiments, a player may submit a player number through an input device. For example, a player may swipe his credit card through a magnetic stripe reader on the gaming device 300, thereby indicating his credit card number. A player may alternatively swipe his driver's license through a magnetic stripe reader on the gaming device 300, thereby indicating his driver's license number, home address, date of birth, height, and weight. A player may also use a numeric keypad to indicate his home telephone number to a gaming device 300. According to another embodiment, the gaming device 300 may prompt a player to provide an indication of a player number.

Examples of bonuses 641 according to some embodiments include improved payouts (e.g., top jackpot increased, extra 10 coins for a given outcome, providing a payout where the previously was none), improved odds (e.g., increased probability of a particular outcome, additional joker or other wildcard added to a deck of cards, top jackpot enabled without max coin play), decreased penalties or odds of penalties (e.g., for games in which a player may be penalized based on certain outcomes), altered game play (e.g., ability to re-spin one of the reels of a slot machine, second draw allowed in video poker), tips or hints (e.g., hints for strategic game play, warnings relating to illogical play, odds calculations), decreased costs (e.g., fewer coins required per handle pull, extra paylines at a reduced fee), free rounds of game play (e.g., a free spin of a slot machine, a free hand of video poker), or an entry into another bonus game (e.g., a lottery, a bonus round, a jackpot-only spin on a slot machine) Embodiments which include a jackpot-only mode are described in detail in related application U.S. application Ser. No. 10/419,304, "GAMING DEVICE METHOD AND APPARATUS EMPLOYING MODIFIED PAYOUTS," which published as U.S.-2003-0228902-A1, and which is hereby incorporated by reference.

A payout may include currency other than money or other legal tender, for example: comp points (e.g., at least one comp point may be credited to a player), casino chips or tokens, frequent flyer miles, calling card minutes (e.g. minutes of long distance phone time), or tokens which have no redemption value but can be used in gaming devices or table games to win real money. An alternate currency may be awarded to a player at a higher rate than real money would be awarded—For example, a player may earn comp points at double the rate he did before receiving a bonus. The player may also be given the option of choosing what type of bonus to receive, and/or at what rate.

Triggers (e.g., 520) and associated comparisons (e.g., 530, 630) and their results may be stored in a bonus tracking database 313 (see FIG. 3). For example, the bonus tracking database 313 can track the date and time a trigger occurred, what comparison was performed in response to the trigger, and whether the comparison was successful. In addition, the database 313 can also store the player number definition 661, description H31 and actual player number used. For example, the database 313 can record that a player number CREDIT_BALANCE (a player's credit meter balance) was $482.00 and that the corresponding player number used in the comparison was the number "482." Similarly, the database 313 can also store the match number definition 662, description 632 and actual match number used. If a comparison was successful, the database 313 can also track what bonus was provided.

What is claimed is:

1. A gaming system comprising:

at least one processor;

at least one input device;

at least one display device; and at least one memory device which stores a plurality of instructions, which when executed by the at least one processor, cause the at least one processor to operate with the at least one display device and the at least one input device to:

(a) enable a player to place a wager to play a wagering game;

(b) determine if a secondary game triggering event randomly occurs; and (c) if the secondary game triggering event randomly occurs, display a play of a secondary game and for the play of the secondary game:

(i) randomly determine a player number based, at least in part, on a first criterion, said player number determined regardless of any amount of the wager placed to play the wagering game and the first criterion being associated with the player prior to the play of the secondary game, (ii) determine a match number based on a second criterion, said match number determined regardless of any amount of the wager placed to play the wagering game, and said second criterion being different than the first criterion, (iii) determine if the match number meets a different, third criterion with respect to the player number, and (iv) provide a benefit if the match number meets the third criterion with respect to the player number.

2. The gaming system of claim 1, wherein the first criterion is at least one characteristic of the player.

3. The gaming system of claim 2, wherein the at least one characteristic includes biometric data associated with the player.

4. The gaming system of claim 1, wherein the first criterion includes data from a player account which is associated with the player.

5. The gaming system of claim 4, wherein when executed by the at least one processor, the plurality of instructions cause the at least one processor to access the data in association with a player tracking card associated with the player account.

6. The gaming system of claim 1, wherein the first criterion is a personal number associated with the player.

7. The gaming system of claim 6, wherein the personal number is a social security number.

8. The gaming system of claim 6, wherein the personal number is a player account number.

9. The gaming system of claim 6, wherein the personal number is a credit card number.

10. The gaming system of claim 1, wherein the first criterion includes a randomly generated number.

11. The gaming system of claim 1, wherein when executed by the at least one processor, the plurality of instructions cause the at least one processor to randomly generate the match number.

12. The gaming system of claim 1, wherein the secondary game triggering event occurs if a winning outcome is generated in association with the play of the wagering game.

13. The gaming system of claim 1, wherein the secondary game triggering event occurs if a losing outcome is generated in association with the play of the wagering game.

14. The gaming system of claim 1, wherein the benefit is a monetary payout.

15. The gaming system of claim 1, wherein the benefit is an addition of credits to a credit meter balance.

16. The gaming system of claim 1, wherein the benefit is a non-cash prize.

17. The gaming system of claim 1, wherein the benefit is a discount on a purchase of at least one of a good and a service.

18. The gaming system of claim 1, wherein when executed by the at least one processor, the plurality of instructions cause the at least one processor to determine that the match number meets the third criterion with respect to the player number if at least one digit of the match number corresponds to at least one digit of the player number.

19. The gaming system of claim 1, wherein when executed by the at least one processor, the plurality of instructions cause the at least one processor to determine that the match number meets the third criterion with respect to the player number if at least one digit of the match number is equal to a corresponding at least one digit of the player number.

20. The gaming system of claim 19, wherein the at least one digit of the match number is the last digit of the match number and the corresponding at least one digit of the player number is the last digit of the player number.

21. The gaming system of claim 19, wherein the at least one digit of the match number is the last two digits of the match number and the corresponding at least one digit of the player number is the last two digits of the player number.

22. The gaming system of claim 1, wherein when executed by the at least one processor, the plurality of instructions cause the at least one processor to determine that the match number meets the third criterion with respect to the player number if the match number is equal to the player number.

23. The gaming system of claim 1, wherein when executed by the at least one processor, the plurality of instructions cause the at least one processor to determine that the match number meets the third criterion with respect to the player number if the match number is within a predetermined range of the player number.

24. The gaming system of claim 1, wherein when executed by the at least one processor, the plurality of instructions cause the at least one processor to determine that the match number meets the third criterion with respect to the player number if the match number is greater than the player number.

25. The gaming system of claim 1, wherein when executed by the at least one processor, the plurality of instructions cause the at least one processor to determine that the match number meets the third criterion with respect to the player number if the match number is less than the player number.

26. The gaming system of claim 1, wherein the third criterion which determines if the match number meets the third criterion with respect to the player number is selected from a database.

27. The gaming system of claim 26, wherein the database is located on an external device remote from the at least one processor.

28. The gaming system of claim 27, wherein the external device is a server.

29. The gaming system of claim 1, wherein when executed by the at least one processor, the plurality of instructions cause the at least one processor to provide the benefit to the player.

30. The gaming system of claim 1, wherein when executed by the at least one processor, the plurality of instructions cause the at least one processor to provide the benefit to a third party associated with the player.

31. The gaming system of claim 30, wherein when executed by the at least one processor, the plurality of instructions cause the at least one processor to enable the player to select the third party.

32. The gaming system of claim 1, wherein when executed by the at least one processor, the plurality of instructions cause the at least one processor to: (i) randomly generate the match number and (ii) provide the benefit to the player if the match number is equal to the player number.

33. A gaming system comprising:

at least one processor;

at least one input device;

at least one display device; and at least one memory device which stores a plurality of instructions, which when executed by the at least one processor, cause the at least one processor to operate with the at least one display device and the at least one input device to, for each play of a wagering game:

(a) enable a player to place a wager amount to play said wagering game, said wager amount being from a credit meter balance associated with the player;

(b) determine if a triggering event occurs; and (c) if the triggering event occurs, display a play of a secondary game and for the play of the secondary game:

(i) determine a current number of credits of the credit meter balance, (ii) randomly determine a match number based on a first criterion, (iii) determine if the match number meets a different, second criterion with respect to the determined number of credits of the credit meter balance, and (iv) provide a benefit to the player if the match number meets the second criterion with respect to the determined number of credits of the credit meter balance.

34. A method of operating a gaming system, said method comprising:

(a) enabling a player to place a wager to play a wagering game;

(b) causing at least one processor to execute a plurality of instructions to determine if a secondary game triggering event randomly occurs; and (c) if the secondary game triggering event randomly occurs, causing at least one display device to display a play of a secondary game and for the play of the secondary game:

(i) causing the at least one processor to execute the plurality of instructions to randomly determine a player number based, at least in part, on a first criterion, said player number determined regardless of any amount of the wager placed to play the wagering game and the first criterion being associated with the player prior to the play of the secondary game, (ii) causing the at least one processor to execute the plurality of instructions to determine a match number based on a second criterion, said match number determined regardless of any amount of the wager placed to play the wagering game, and said second criterion being different than the first criterion, (iii) causing the at least one processor to execute the plurality of instructions to determine if the match number meets a different, third criterion with respect to the player number, and (iv) providing a benefit if the match number meets the third criterion with respect to the player number.

35. The method of claim 34, wherein the first criterion is at least one selected from the group consisting of: at least one characteristic of the player, a personal number associated with the player, and a randomly generated number.

36. The method of claim 34, wherein the secondary game triggering event is at least one event selected from the group consisting of: a generation of a winning outcome in association with the play of the wagering game, and a generation of a losing outcome in association with the play of the wagering game.

37. The method of claim 34, wherein the benefit is at least one selected from the group consisting of: a monetary payout, an addition of credits to a credit meter balance associated with the player, a non-cash prize, and a discount on a purchase of at least one of a good and a service.

38. The method of claim 34, wherein the match number meets the third criterion with respect to the player number if a designated event occurs, said designated event selected from the group consisting of: at least one digit of the match number corresponds to at least one digit of the player number, at least one digit of the match number is equal to a corresponding at least one digit of the player number, the match number is equal to the player number, the match number is within a predetermined range of the player number, the match number is greater than the player number, and the match number is less than the player number.

39. The method of claim 34, which includes: (i) randomly generating the match number and (ii) providing the benefit to the player if the match number is equal to the player number.

40. The method of claim 34, which is provided through a data network.

41. The method of claim 40, wherein the data network is an internet.

42. A method of operating a gaming system, said method comprising:

(a) for each play of a wagering game, enabling a player to place a wager amount to play said wagering game, said wager amount being from a credit meter balance associated with the player;

(b) causing at least one processor to execute a plurality of instructions to determine if a triggering event occurs; and (c) if the triggering event occurs, causing at least one display device to display a play of a secondary game and for the play of the secondary game:

(i) causing the at least one processor to execute the plurality of instructions to determine a current number of credits of the credit meter balance, (ii) causing the at least one processor to execute the plurality of instructions to randomly determine a match number based on a first criterion, (iii) causing the at least one processor to execute the plurality of instructions to determine if the match number meets a different, second criterion with respect to the determined number of credits of the credit meter balance, and (iv) providing a benefit to the player if the match number meets the second criterion with respect to the determined number of credits of the credit meter balance.

43. The method of claim 42, which is provided through a data network.

44. The method of claim 43, wherein the data network is an internet.

* * * * *

UNITED STATES PATENT AND TRADEMARK OFFICE

CERTIFICATE OF CORRECTION

PATENT NO. : 8,277,302 B2
APPLICATION NO. : 11/743353
DATED : October 2, 2012
INVENTOR(S) : Jay S. Walker et al.

It is certified that error appears in the above-identified patent and that said Letters Patent is hereby corrected as shown below:

IN THE CLAIMS

Column 22, In Claim 20, Lines 10 and 12, replace each instance of "the last" with --a last--.
Column 22, In Claim 21, Lines 14 and 16, replace each instance of "the last" with --a last--.

Signed and Sealed this
First Day of January, 2013

David J. Kappos

David J. Kappos
*Director of the United States Patent and Trademark Office*

UNITED STATES PATENT AND TRADEMARK OFFICE

CERTIFICATE OF CORRECTION

PATENT NO. : 8,277,302 B2
APPLICATION NO. : 11/743353
DATED : October 2, 2012
INVENTOR(S) : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1515 days.

Signed and Sealed this
Second Day of September, 2014

Michelle K. Lee

Michelle K. Lee
*Deputy Director of the United States Patent and Trademark Office*